United States Patent [19]
Kumata et al.

[11] 3,887,682
[45] June 3, 1975

[54] PROCESS FOR PURIFYING A GAS CONTAINING HYDROGEN SULFIDE AND HYDROGEN CYANIDE

[75] Inventors: Seiji Kumata; Youichi Shimoi; Terubika Hirabayashi; Yukinori Hiwatashi, all of Tokyo, Japan

[73] Assignee: Nittetu Chemical Engineering Limited, Tokyo, Japan

[22] Filed: Nov. 2, 1972

[21] Appl. No.: 303,078

[30] Foreign Application Priority Data
Nov. 2, 1971  Japan................................ 46-86765

[52] U.S. Cl. ................ 423/232; 423/236; 423/561
[51] Int. Cl. ........................ C01b 17/24; C01c 3/04
[58] Field of Search .......... 423/232, 233, 234, 236, 423/366, 182, 183, 561, 224

[56] References Cited
UNITED STATES PATENTS

| | | | |
|---|---|---|---|
| 1,542,971 | 6/1925 | Speer, Jr. et al..................... | 423/232 |
| 1,653,933 | 12/1927 | Speer, Jr. et al..................... | 423/232 |
| 2,837,398 | 6/1958 | Grosskinsky et al................ | 423/234 |
| 3,086,838 | 4/1963 | Giammarco..................... | 423/232 X |
| 3,359,069 | 12/1967 | Furkert et al...................... | 423/540 |
| 3,661,507 | 5/1972 | Brietbach et al. .............. | 423/236 X |

FOREIGN PATENTS OR APPLICATIONS

| | | | |
|---|---|---|---|
| 6,062 | 3/1892 | United Kingdom................. | 423/232 |
| 494,281 | 10/1938 | United Kingdom................. | 423/234 |
| 519,762 | 12/1955 | Canada.............................. | 423/236 |

*Primary Examiner*—O. R. Vertiz
*Assistant Examiner*—Gary P. Straub
*Attorney, Agent, or Firm*—Lane, Aitken, Dunner & Ziems

[57] ABSTRACT

A wet-type desulfurization process is disclosed for purifying gases containing hydrogen sulfide and hydrogen cyanide contaminants. The gas is washed with an alkaline aqueous solution to absorb the contaminants. The wash solution containing the dissolved contaminants is oxidized to form free sulfur from any hydrosulfide salt that might be present. The sulfur is removed as a precipitate. The oxidized wash solution is then roasted to convert the thiocyanates, sulfates, sulfites, and thiosulfates to carbonates, sulfides and hydrosulfides. These salts are then recovered in an aqueous solution, which solution is recycled for use in the absorption or oxidation steps.

2 Claims, 1 Drawing Figure

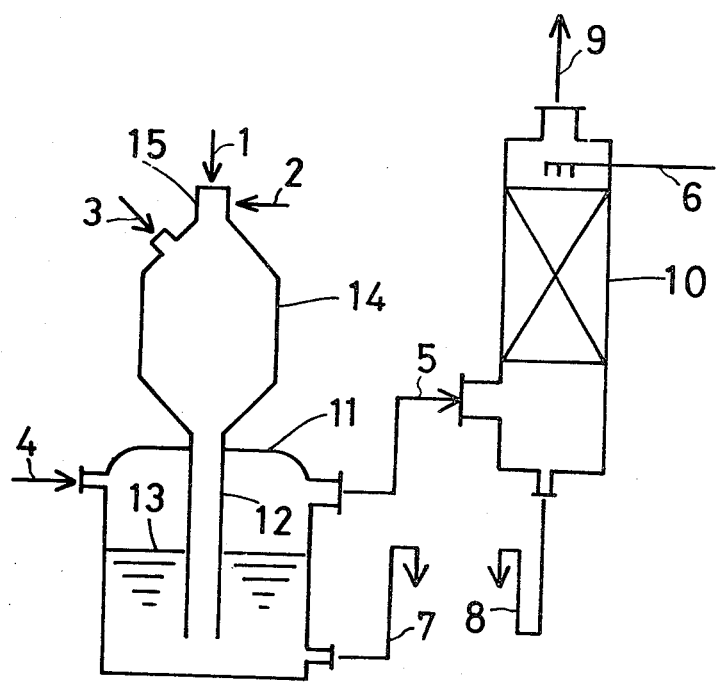

PROCESS FOR PURIFYING A GAS CONTAINING HYDROGEN SULFIDE AND HYDROGEN CYANIDE

BACKGROUND OF THE INVENTION

This invention relates to a process for purifying a gas containing hydrogen sulfide and/or hydrogen cyanide and more particularly to a process for treating an alkaline aqueous solution in which hydrogen sulfide and/or hydrogen cyanide have been absorbed.

In a prior art process a gas, such as coke oven gas containing hydrogen sulfide, is passed through an absorption vessel containing an alkaline aqueous solution of sodium carbonate or ammonia. In the absorption vessel hydrogen sulfide is dissolved as hydrosulfide in the alkaline aqueous solution. The alkaline aqueous solution with absorbed hydrogen sulfide is then introduced into an oxidation vessel wherein it is oxidized, in the presence of a catalyst or without a catalyst, with an oxygen-containing gas such as air. The oxidation causes the sulfur to precipitate and the alkaline aqueous solution to recover its absorptive capability. The precipitated sulfur is separated and the alkaline aqueous solution is recovered for re-use as an absorbent liquid. This process is known as a wet type desulfurization process. The mechanism of the reaction in this process is as follows:

In the absorption stage, $$H_2S + Na_2CO_3 \rightarrow NaHS + NaHCO_3 \quad (1)$$

$$H_2S + NH_4OH \rightarrow NH_4HS + H_2O \quad (2)$$

In the oxidation stage, $$NaHS + NaHCO_3 + \tfrac{1}{2}O_2 \rightarrow Na_2CO_3 + H_2 + S \quad (3)$$

$$NH_4HS + \tfrac{1}{2}O_2 \rightarrow NH_4OH + S \quad (4)$$

In cases where the starting gas contains hydrogen cyanide in addition to the hydrogen sulfide, the hydrogen cyanide is absorbed in the absorption stage together with hydrogen sulfide in the absorbent alkaline liquid to form a cyanide solution. In the wet type process described above, the cyanide in the absorbent liquid is converted into thiocyanate according to the following formulae which demonstrate the oxidation treatment of the spent scrubbing liquid in the oxidation stage:

$$NaHS + NaCN + \tfrac{1}{2}O_2 \rightarrow NaCNS + NaOH \quad (5)$$

$$NH_4HS + NH_4CN + \tfrac{1}{2}O_2 \rightarrow NH_4CNS + NH_4OH \quad (6)$$

The thiocyanate produced by the oxidation treatment, shown above is not decomposed or eliminated by the standard desulfurization process, therefore, it will gradually accumulate in the absorbent alkaline liquid, thus lowering the absorption capability of the absorbent alkaline liquid.

Also, in the oxidation treatment of the spent absorbent liquid, part of the hydrosulfide in the absorbent liquid is converted into sulfur oxide salts such as sulfate, sulfite and thiosulfate, which salts also tend to accumulate in the absorbent liquid.

SUMMARY OF THE INVENTION

It has now been discovered that when the alkaline absorbent liquid containing sulfur oxides and thiocyanate is roasted at a specific air ratio within a specific temperature range and the products brought into contact with water, the sulfur and soda components of the spent absorbent liquid can be efficiently recovered as an aqueous solution containing, for example, sodium carbonate, sodium hydrosulfide, and ammonium hydrosulfide.

Accordingly, it is an object of the present invention to provide a process wherein the salts which have accumulated in the absorbent liquid in the manner previously described are decomposed.

It is another object of the present invention to improve the efficiency and economics of the standard wet-type desulfurization process.

Other objects and features of the present invention will be clear from a reading of the ensuing description taken in conjunction with the appended claims and accompanying drawing.

BRIEF DESCRIPTION OF THE DRAWING

The sole figure is a flow diagram of the process of the present invention.

DESCRIPTION OF THE PREFERRED EMBODIMENTS

The spent absorbent liquid containing thiocyanate, produced in the oxidation stage of the absorbent liquid, and sulfur oxides consisting essentially of sulfate and thiosulfate (which will be referred to as the "inactive salts" hereinafter), is roasted using a fuel such as propane gas or coke oven gas at an air ratio of below 0.95 and at a combustion temperature within the range of 650° C to 1100° C. The reason for roasting at the above specified conditions is that, an air ratio over 0.95 or a combustion temperature lower than 650° C, will result in incomplete decomposition of the thiocyanate and sulfur oxides contained in the absorbent liquid. On the other hand, a combustion temperature over 1100° C will increase the amount of sulfate in the solution. In practical applications, to effect the roasting of the spent absorbent liquid, the absorbent liquid is injected into the furnace, and the fuel and air are introduced through a burner into the furnace, thus effecting mixed combustion.

"Air ratio" is the ratio of the amount of oxygen actually used in combustion (oxygen in the fuel plus that present in the air feed) to the "theoretical oxygen requirement."

The "theoretical oxygen requirement" is the amount of oxygen necessary to effect the conversion of the carbon of the fuel to carbon dioxide gas, the hydrogen component into steam and the sulfur component into sulfurous acid gas ($SO_2$).

The amount of air introduced into the furnace is adjusted to an air ratio of below 0.95. The roasting will convert the sodium component in the absorbent liquid into an alkali compound (which will be referred to as "active salt" hereinafter) such as sodium sulfide, sodium hydrosulfide, or sodium carbonate. Other components will be converted into hydrogen sulfide, sulfurous acid gas, carbon monoxide gas, carbon dioxide gas, nitrogen, hydrogen and steam. The gas and roasting products thus obtained are subsequently brought into contact with water to be dissolved or absorbed and cooled. If the cooled gas contains unabsorbed hydrogen sulfide and/or unabsorbed sulfurous acid gas, it should preferably be washed a second time with water containing an alkaline substance such as sodium carbonate, ammonia, or caustic soda to remove the hydrogen sulfide and sulfurous acid gas ($SO_2$). The dissolution in water and cooling as described above will recover, as an aqueous solution, sodium carbonate, sodium sulfite, sodium hydrosulfide and ammonium hydrosulfide.

Alternatively, instead of subjecting the spent liquor to separate oxidation and roasting treatments, the oxidation and roasting could be effected in a single step.

The treatment cycle will now be described with reference to the flow sheet of the accompanying drawing, which shows one embodiment of the present invention. Shown at 10 is a packed tower, at 11 a tank, at 13 the surface of a liquid stored in the tank 11, at 12 a pipe, at 14 a furnace, at 15 a burner. The burner 15 is supplied with an auxiliary fuel, such as propane, and air enters at 1 and 2. The solution containing inactive salts such as sodium thiosulfate and ammonium thiocyanate is introduced into the furnace 14 at 13 through a spraying means for mixed combustion with the high temperature combustion gas supplied through the burner 15. During this combustion, by adjusting the ratio of air to auxiliary fuel and the roasting temperature, the sodium of the inactive salt is converted into sodium sulfide and sodium carbonate, while the remaining components of the inactive salts are converted into hydrogen sulfide, sulfurous acid gas, carbon monoxide, carbon dioxide, nitrogen gas, hydrogen gas, steam, etc. Since sulfurous acid gas dissolves in water and reacts with alkaline material, such as sodium carbonate to give sulfites which are "inactive salts," the roasting conditions should be adjusted to the previously specified ranges, thereby minimizing the formation of sulfurous acid gas ($SO_2$).

The gas containing the roasting products is introduced through pipe 12 under the surface 13 of the liquid stored in the tank 11. The gas discharged into the liquid rises through the liquid, during which time the sodium sulfide, sodium carbonate hydrogen sulfide and sulfurous acid gas contained in the gas will be absorbed in the liquid and cooled. Thereafter the gas passes through 5 to the packed tower 10. Since the gas entering the packed tower 10 often contains unabsorbed hydrogen sulfide and sulfurous acid gas, it should be scrubbed again with water, preferably the water containing alkali such as sodium carbonate, ammonia, caustic soda. The scrubbing water is introduced through 6, and ejected through a spray means to contact the gas as it rises through the tower 10 so that the remaining hydrogen sulfide and sulfurous acid gas is absorbed in the aqueous scrubbing solution. The gas thus washed is discharged through 9, while the washings are discharged through 8. The gas discharged through 9 contains hydrogen and carbon monoxide gas and, therefore, is toxic and dangerous. Accordingly, it should be incinerated to eliminate the hazard.

Line 7 is the discharge route for the liquid stored in the tank 11. Inlet 4 is the water supply route for the tank 11.

For better absorption of hydrogen sulfide and sulfurous acid gas, the water supplied through 4 should preferably be an alkaline aqueous solution containing sodium carbonate, caustic soda, ammonia, etc.

The "inactive salts" - thiocyanates, sulfates, thiosulfates, sulfites, etc. - are converted in the furnace 14 into "active salts" such as sodium carbonate, sodium sulfide, sodium hydrosulfide, and ammonium hydrosulfide. The "active salts" are those which decompose during the oxidation treatment to yield free sulfur or which are capable of reacting with $H_2S$ in the absorption stage.

The present invention contemplates that the absorbent liquid regenerated by oxidation in the desulfurization process previously described may be used as the alkaline aqueous solution fed through lines 4 and 6, and that the solutions of sodium carbonate, sodium sulfide and sodium hydrosulfide, which exit at 7 and 8, may be recycled to the desulfurization plant.

If sulfurous acid gas is generated in the roasting operation, it tends to dissolve in water, resulting in the formation of sulfite and thiosulfate.

The following shows the equilibrium relationship between sulfurous acid gas, hydrogen, hydrogen sulfide, and steam:

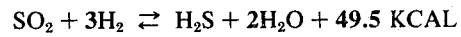

$$SO_2 + 3H_2 \rightleftarrows H_2S + 2H_2O + 49.5 \text{ KCAL}$$

In the present invention, the flow of the solution supplied through line 3 to the furnace 14 is controlled so that there will result no significant fluctuation in the steam pressure within the furnace 14. From the above reaction formula, it can be seen that the reaction shifts to the right with increasing hydrogen partial pressure and decreasing temperature, because the reaction toward the right is an exothermic reaction. In other words, in the present invention, it is desirable to maintain a low air ratio in the combustion of the auxiliary fuel in order to lower the roasting temperature. However, too low a temperature will result in increasing the amount of undecomposed "inactive salts". Accordingly, the roasting temperature should be within the range of 650° C to 1100° C, preferably 700° C to 950° C and the air ratio should be below 0.95, preferably below 0.8.

The following example is presented for purposes of illustration and should not be construed as limiting the scope of the present invention.

EXAMPLE

Using apparatus as illustrated in the drawing, the feeds introduced into the furnace were regulated to maintain a roasting temperature of 800° C to 850° C. Propane gas was introduced through 1 at a rate of 1.1 to 1.4 $NM^3/hr$ with air at a rate of 21 to 27 $NM^3/hr$ to give an air ratio of 0.8. An aqueous solution, having the composition shown in the table below, was injected through 3 at a rate of 5 L/hr. A caustic soda solution of about 2.5% was supplied to the furnace through the spray means 6 at a rate of 45 L/hr, discharged via 8, and was introduced into tank 11 through 4. The aqueous solution leaving the system via leg 7 had the composition shown in the table below.

| Liquid Entering at 3 | Mol./liter | Mol./hr | Liquid Exiting at 7 | Mol./hr |
|---|---|---|---|---|
| $Na_2CO_3$ | 0.238 | 1.19 | $Na_2CO_3$ | 3.51 |
| $NaHCO_3$ | 0.335 | 1.68 | $Na_2S$ | 16.2 |
| $Na_2S_2O_3$ | 0.380 | 1.90 | $Na_2S_2O_3$ | 0.264 |
| $Na_2SO_4$ | 0.830 | 4.15 | $Na_2SO_4$ | 1.30 |
| $NH_4CNS$ | 2.19 | 10.95 | $Na_2SO_3$ | 0.884 |
| | | | CNS | ≈ 0 |
| | | | CN | ≈ 0 |

What is claimed is:

1. In a process for purifying a gas containing hydrogen sulfide and hydrogen cyanide in which said gas is washed with an aqueous alkaline solution to dissolve the hydrogen sulfide as hydrosulfide and the hydrogen cyanide as cyanide, the aqueous solution containing hydrosulfide and cyanide being oxidized to form thiocyanates, sulfur oxide salts and a precipitate of free sulfur which precipitate is then removed from the aqueous alkaline solution; the improvement which comprises: reductively roasting the aqueous alkaline solution containing thiocyanates and sulfur oxide salts in a combustion zone at 650°–1100°C and with an air ratio of less than 0.95 to convert at least a portion of said thiocyanates and sulfur oxide salts to sulfides; dissolving said sulfides to form a thiocyanate and sulfur oxide salt depleted alkaline solution; and recycling said depleted solution to the alkline aqueous wash solution.

2. The process of claim 1 wherein said solution containing thiocyanates and sulfur oxide salts is sprayed into the combustion zone.

* * * * *

UNITED STATES PATENT OFFICE
CERTIFICATE OF CORRECTION

Patent No. 3,887,682　　　　　　　　Dated June 3, 1975

Inventor(s) Seiji Kumata; Youichi Shimoi; Terbika Hirabayashi and Yukinori Hiwatashi It is certified that error appears in the above-identified patent and that said Letters Patent are hereby corrected as shown below:

On the first page of the patent, the inventor's name "Terubika Hirabayashi" should read --Teruhiko Hirabayashi--.

Signed and Sealed this twenty-fifth Day of May 1976

[SEAL]

Attest:

RUTH C. MASON
Attesting Officer

C. MARSHALL DANN
Commissioner of Patents and Trademarks